United States Patent [19]

Bovenkerk

[11] 4,268,276

[45] May 19, 1981

[54] COMPACT OF BORON-DOPED DIAMOND AND METHOD FOR MAKING SAME

[75] Inventor: Harold P. Bovenkerk, Worthington, Ohio

[73] Assignee: General Electric Company, Worthington, Ohio

[21] Appl. No.: 11,771

[22] Filed: Feb. 13, 1979

Related U.S. Application Data

[63] Continuation of Ser. No. 899,780, Apr. 25, 1978, abandoned.

[51] Int. Cl.³ .............................................. B24D 3/08
[52] U.S. Cl. ...................................... 51/295; 51/307; 51/309; 264/332
[58] Field of Search ................. 51/295, 307, 308, 309; 264/320, 332

[56] References Cited

U.S. PATENT DOCUMENTS

| | | | |
|---|---|---|---|
| 3,141,855 | 7/1964 | Wentorf, Jr. ........................... | 51/309 |
| 3,148,161 | 9/1964 | Wentorf, Jr. et al. ................. | 51/309 |
| 3,407,445 | 10/1968 | Strong ................................... | 51/307 |
| 3,574,580 | 4/1971 | Stromberg et al. .................... | 51/307 |
| 3,609,818 | 10/1971 | Wentorf, Jr. ........................... | 51/307 |
| 3,744,982 | 7/1973 | Bovenkerk et al. ................... | 51/307 |
| 3,745,623 | 7/1973 | Wentorf et al. ....................... | 51/309 |
| 3,785,093 | 1/1974 | Vereschagin et al. ................. | 51/309 |
| 3,831,428 | 8/1974 | Wentorf et al. ....................... | 51/309 |
| 3,913,280 | 10/1975 | Hall ....................................... | 51/307 |

FOREIGN PATENT DOCUMENTS 756730   4/1977   South Africa ........................ 51/309

OTHER PUBLICATIONS

Nature, vol. 210, No. 5031, pp. 90-91, Apr. 2, 1966.

*Primary Examiner*—Donald J. Arnold
*Attorney, Agent, or Firm*—Douglas B. Little; D. A. Dearing

[57] ABSTRACT

In one embodiment, a compact for tools, such as cutting, drilling, wire drawing and shaping tools, consists essentially of a porous mass of self-bonded, boron-doped diamond particles and a catalyst-solvent material. The method for making such a compact comprises the steps of bonding a mass of boron-doped diamond particles, aided by a catalyst-solvent material, under high temperatures and high pressures (HP/HT).

In another embodiment, a composite compact, which is made in a similar manner to the first embodiment, consists essentially of (i) a layer of a porous mass of self-bonded, boron-doped diamond particles and catalyst-solvent material; and (ii) a substrate layer of cemented carbide bonded to the diamond layer.

21 Claims, 5 Drawing Figures

COMPACT OF BORON-DOPED DIAMOND AND METHOD FOR MAKING SAME

This is a continuation of application Ser. No. 899,780 filed Apr. 25, 1978, now abandoned.

BACKGROUND OF THE INVENTION

This invention relates to tools such as cutting, drilling, shaping and wire drawing tools and more particularly to tool components comprised of diamond compacts.

Particle is defined as an individual abrasive crystallite or fragment thereof.

A cluster compact is defined as a cluster of abrasive particles bonded together either (1) in a self-bonded relationship, (2) by means of a mechanical or chemical bonding medium disposed between the crystals, (3) by means of some combination of (1) and (2). Reference can be made to U.S. Pat. Nos. 3,136,615; 3,233,988; and 3,690,818 for a detailed disclosure of certain types of cluster compacts and methods for making same. (The disclosures of these patents are hereby incorporated by reference herein.)

A composite compact is defined as a cluster compact bonded to a substrate material such as cemented tungsten carbide. The bond to the substrate can be formed either during or subsequent to the formation of the cluster compact. It is, however, highly preferred to form the bond during formation of the cluster compact. Reference can be made to U.S. Pat. Nos. 3,743,489; 3,745,623; 3,767,371; and 3,831,428 for a detailed disclosure of certain types of composite compacts and methods for making same. (The disclosures of these patents are hereby incorporated by reference herein.)

Before the invention of diamond compacts, large single crystal natural diamond was used in the most severe machining, wire drawing and drilling applications. A primary object of the development of diamond compacts was to replace the large single crystal natural diamonds with a polycrystalline mass in these applications. To do this it was necessary to produce a polycrystalline mass with properties which at least approximate or, more desirably, improve over that of single crystal diamond. This has been essentially achieved. For example, single crystal diamond is sensitive to fracture and chippage along certain planes, thereby requiring precise orientation to maximize its life. A compact, because of its polycrystalline nature, is highly resistant to fracture and chippage and does not require orientation as its properties are non-directional. Also, compacts produced in accordance with the invention set forth in U.S. Pat. No. 3,745,623 have been made with a hardness of between 5,000 and 8,000 knoop hardness at a 3,000 gram load which is approximately 60 to 100% of the hardness of single crystal diamond. The most important factor in producing compacts which have properties competitive with single crystal diamond is the ability to achieve extensive self-bonding or diamond-to-diamond bonding within the compact. Even with the quality of compact products now produced with prior art techniques, the utility and life of such compacts would be improved if more extensive diamond-to-diamond bonding could be achieved. This, of course, would have a significant impact on the commercial success of such a product.

Another approach to making compacts more competitive with single crystal would be to reduce the cost of production. Prior art compacts are produced by a process requiring severe HP/HT conditions. Such processes are inherently expensive thereby yielding expensive products because of the sophisticated apparatus necessary to achieve and maintain such conditions for a sufficient period of time to produce a strong integral compact. It has been found that the degree of self-bonding achieved increases with time of exposure of the compact to HP/HT conditions or with an increase in the HP conditions. However, increases in the exposure time or the HP conditions can mean significantly increased cost of manufacture because of a reduction in life of the HP/HT apparatus used in the process.

Accordingly, it is an object of this invention to provide an improved diamond compact by increasing the degree of self-bonding or diamond-to-diamond bonding present in the compact.

Another object of this invention is to provide an improved process for making diamond compacts whereby a high degree of diamond-to-diamond bonding is achieved at less severe HP/HT conditions or at HP/HT values similar to that of the prior art but which are maintained for a shorter period of time.

SUMMARY OF THE INVENTION

The foregoing objects and others, which will be apparent from a consideration of the following detailed description in connection with the accompanying claims, are accomplished by providing a compact comprising a porous mass of self-bonded, boron-doped diamond and a catalyst-solvent material infiltrated throughout said mass. The compact is produced by bonding a mass of boron-doped diamond particles into a self-bonded body through the use of a catalyst-solvent material under HP/HT. In a preferred embodiment, the body formed at HP/HT consists essentially of a porous mass of the self-bonded particles with the catalyst-solvent material (e.g., cobalt or cobalt alloys) infiltrated throughout the mass.

It has been discovered that boron-doped diamond particles (relative to undoped diamond) have a substantially improved tendency to self bond to each other under HP/HT conditions conducive to the formation of a compact therefrom.

In another embodiment, a composite compact, which is made in a similar manner to the first embodiment, is comprised of (i) a layer or porous, self-bonded diamond with catalyst-solvent material infiltrated in and filling the pores, and (ii) a substrate layer of cemented carbide bonded to the abrasive particle layer.

In still another embodiment, a compact is comprised of a porous mass of self-bonded, boron-doped diamond particles, the catalyst solvent material having been substantially removed from the pores.

DESCRIPTION OF THE PREFERRED EMBODIMENTS

Figure 1:
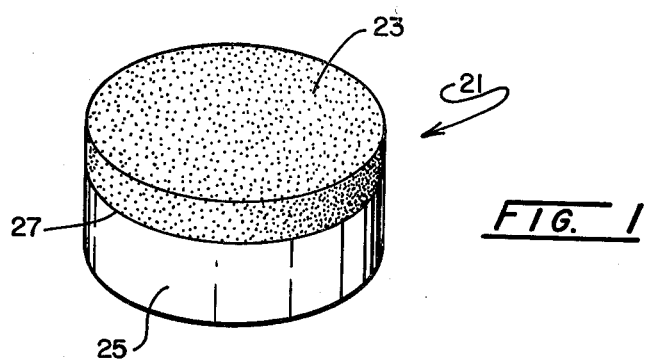
FIG. 1 is a perspective view of a diamond composite compact in accordance with one embodiment of this invention.
Figure 2:
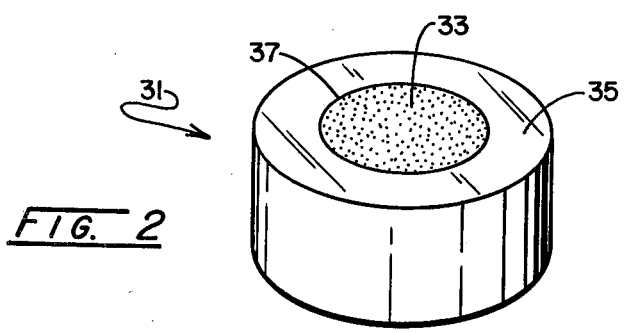
FIG. 2 is a perspective view of an alternate form of the embodiment (for use, e.g., as a wire drawing die) of the invention shown in FIG. 1.
Figure 3:
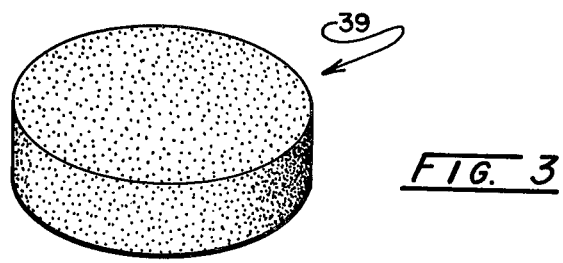
FIG. 3 is a perspective view of a cluster compact in accordance with another embodiment of this invention.

This invention is directed basically to improvements in the structure of self-bonded masses of diamond and processes for producing the same. It can be exemplified by a variety of embodiments. FIGS. 1 and 2 show two variations of a composite compact. FIG. 3 shows a cluster compact.

As shown in FIG. 1, a composite compact 21, for cutting and drilling tool applications, is comprised of boron-doped diamond mass or layer 23 and a cemented carbide layer 25 bonded to diamond layer 23 along an interface 27.

As shown in FIG. 2, a composite compact 31, for an application such as wire drawing die, is comprised of a diamond layer or core 33 and a layer or outer ring 35 of cemented carbide surrounding and bonded to said diamond core 33 along an interface 37. To be fabricated into a wire die, a hole would be drilled longitudinally of core 33 such as shown in U.S. Pat. No. 3,831,428.

Another embodiment of this invention as shown in FIG. 3 is a cluster compact 39 for an application such as a cutting tool insert. Compact 39 is comprised solely of a porous mass of self-bonded, boron-doped diamond particles and catalyst-solvent material dispersed in the pores of the diamond structure as a second phase.

Figure 4:
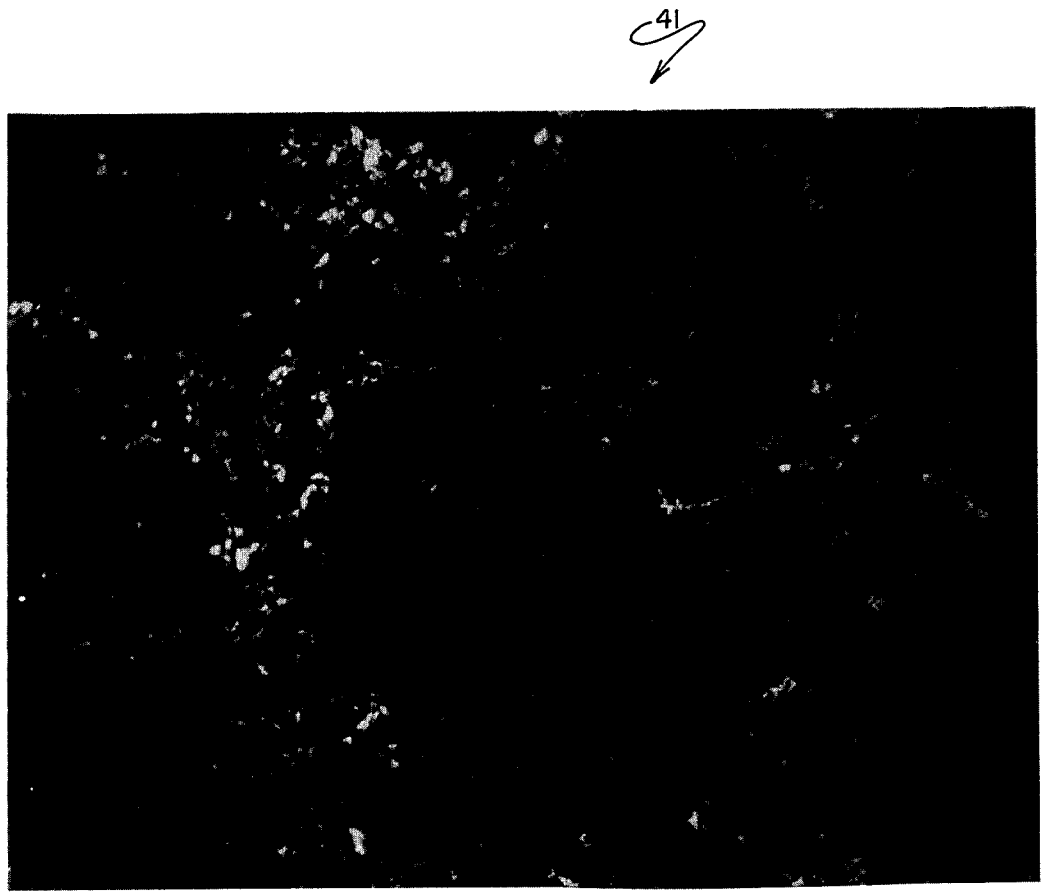
FIG. 4 is a photomicrograph of a portion of a ground and polished surface of a diamond compact as shown in FIGS. 1–3 and of the compact produced by Example I herein.

FIG. 4 shows a portion of a ground and polished surface of a bonded body 41 of diamond in accordance with this invention. Body 41 is identical to that which may be used to constitute mass 23 of compact 21 (FIG. 1), diamond core 33 of composite compact 31 (FIG. 2) and cluster compact 39 (FIG. 3). The body 41 comprises a porous mass of self-bonded, boron-doped diamond particles 43 which comprise preferably between 70% and 97% by volume of the body. Interfaces 45 are representative of the self-bonding of or diamond-to-diamond bonding between adjacent particles 43. The same diamond crystals 43 seen in the ground surface of body 41 shown in FIG. 4 are bonded in the third dimension to adjacent diamond crystals (not seen). A metallic phase of a catalyst-solvent material 47 for diamond is infiltrated substantially uniformly throughout the diamond mass and is believed to be encapsulated in closed regions formed by adjacent diamond particles and in a network of interconnected pores 49 dispersed throughout the mass. This phase comprises preferably the remaining volume of the compact (i.e., between about 3% and 30% by volume of the compact).

Acceptable particle size range for diamond particles 43 is between 1 and 1000 micrometers. A range of particle sizes is preferred primarily to increase the packing density of the diamond mass prior to fabrication into a compact under HP/HT.

In still another embodiment of the invention, the catalyst-solvent material may be substantially removed from the compact by acid leaching of the material from the interconnected pores of the compact. The procedure for the production of such a leached compact is fully described in U.S. application Ser. No. 890,898; filed Mar. 28, 1978, in the name of Bovenkerk et al., the disclosure of which is hereby incorporated by reference herein.

In accordance with the features of this invention, boron-doped diamond particles have been found to be markedly superior in their tendency to self bond or to form diamond-to-diamond bonds between the diamond particles when subjected to HP/HT conditions conducive to the formation of a compact therefrom. Thus, compacts with more extensive self bonding can be achieved at HP/HT conditions comparable to those used in the prior art. Alternatively, a degree of self bonding comparable to that achieved by prior art techniques may be achieved at less severe HP/HT conditions.

The basic known properties of boron-doped diamond as distinguished from undoped synthetic diamond are low electrical resistivity (e.g., see U.S. Pat. No. 3,148,161) and high oxidation resistance (e.g., see Nature, Vol. 210, No. 5031, pp 90, 91). Neither of these properties in any way suggests this unexpected enhancement of self bonding achieved by this invention. In fact, the mechanism by which the boron dopant effects enhanced bonding is not known.

Briefly, a preferred embodiment of a method for preparing a compact in accordance with the features of this invention (including the two embodiments shown in FIGS. 1—3) comprises the steps, in order, of:

(a) placing within a reaction cell or charge assembly a mass of boron-doped diamond particles and a source of catalyst-solvent material which is active catalytically as a growth medium for promoting self bonding of diamond particle mass;

(b) simultaneously subjecting the cell and the contents thereof to temperatures in the range of 1200° C. to 2000° C. and pressures in excess of 40 kbars, preferably for a time in excess of about 10 mins.;

(c) ceasing the input of heat to the cell and allowing the cell and its contents to cool;

(d) removing the pressure applied to the cell; and (e) removing from the cell an abrasive body formed by steps (a) to (d) and which is comprised of a porous mass of particles in self-bonded form with a metallic phase comprised of the catalyst-solvent material infiltrated throughout the porous mass.

"Simultaneously", step (b) above, is used herein to mean that the HP/HT conditions exist or occur at the same time but does not require that the times of initiation or termination of the HP and HT conditions be coincident (although the times may be).

Preferred embodiments of the above method for making a compact of diamond particles, except for the use of boron-doped diamond as the starting material, are more fully described in U.S. Pat. Nos. 3,745,623; 3,831,428; and 3,609,818 which are incorporated by reference herein.

Briefly, as described in these patents, diamond compacts are prepared by HP/HT processing, wherein hot, compressing diamond particles are infiltrated with a catalyst-solvent material by axial or radial sweep-through of the material through the diamond particles. During sweep-through, catalyzed sintering of the diamond particles occurs leading to extensive self-bonding or diamond-to-diamond bonding. As disclosed in U.S. Pat. Nos. 2,947,609 and 2,947,610 (both of which are hereby incorporated herein by reference), the catalyst-solvent material is selected from the group consisting of (1) a catalytic metal, in elemental form, selected from the group consisting of Group VIII metals, Cr, Mn, Ta; (2) a mixture of alloyable metals of the catalytic metal(s) and non-catalytic metal(s); (3) an alloy of at least two of said catalytic metals; and (4) an alloy of the catalytic metal(s) and non-catalytic metal(s). Cobalt in elemental form or alloy form is preferred. This material forms a metallic phase in the abrasive body formed at HP/HT as denoted in step (e) above.

In the practice of step (a) above, the boron-doped diamond may be produced in accordance with prior art processes disclosed in U.S. Pat. No. 3,148,161 which is hereby incorporated by reference herein. In brief, the boron-doped diamond is grown or produced by using (a) boron-doped graphite, (b) a boron-doped catalyst-solvent material, (c) a boron compound added to the diamond growing reactants, (d) a borosilicate glass liner for the diamond growing reactants, or (e) combinations of the foregoing approaches. The preferred level of boron doping is between about 0.01% to 0.5% of the weight of the doped crystal.

As a result of these growth processes, the boron atoms are substantially uniformly dispersed in the doped diamond crystals and are believed to be directly incorporated in diamond crystal lattice. It is theorized that the incorporation of the dopant in this manner somehow weakens or "softens" the diamond particles. Thus, upon subjection of HP/HT during compact fabrication, the particles can be more tightly compacted into an improved compact having increased self-bonding and decreased pore volume.

Boron-doped diamond may also be produced as disclosed in U.S. Pat. No. 3,141,855 by diffusing boron atoms into the surface of the diamond crystal by subjecting the diamond crystal to pressure of at least 8,500 atmospheres and a temperature of at least 1300° C. in the presence of boron atoms. However, doped diamond produced by this process is believed to be inferior for use as a starting material in accordance with this invention to that produced in accordance with U.S. Pat. No. 3,148,161. This is believed to be true because the growth process of U.S. Pat. No. 3,148,161 results in bulk softening of the crystal rather than only superficial softening of the particle surface by the diffusion process of U.S. Pat. No. 3,148,855.

As is well known in the art, the diamond is also preferably heated in a $H_2$ gas reducing atmosphere prior to placement in the reaction cell. The boron-doped diamond placed in the reaction cell may also contain minor quantities of graphite powder (with or without a B dopant), carbide molding powder, catalyst-solvent metal powder or mixtures of the foregoing. The preferred diamond content of such a mixture will range from 90 to 99+% by volume. However, a somewhat lower content of diamond grit may be employed, the lowest diamond content being about 70% diamond (by volume). The diamond content may be reduced below 70% if the amount of reduction to a level less than 70% is replaced by an equal amount of graphite. However, as will be realized with increasingly lower diamond content, the hardness and abrasion resistance of the compact produced therefrom is degraded. Reference can be made to U.S. Pat. No. 3,745,623; col. 4; lines 36–46; and to col. 6; lines 9–13; for more details of the constituents used to form diamond layer. (While U.S. Pat. No. 3,745,623 refers only to composite compacts, the referenced subject matter applies also to cluster compacts.)

In one embodiment of this method, according to U.S. Pat. Nos. 3,745,623 and 3,831,428, a composite compact (such as shown in FIGS. 1 and 2) is made by the in situ bonding of a diamond particle layer to a cemented carbide substrate. The material for forming the carbide substrate (either from a carbide molding powder or from a preformed body) is the preferred source of the catalyst-solvent material. Reference can be made to U.S. Pat. No. 3,745,623; col. 5, lines 58 to col. 6, line 8; and col. 8, lines 57 to col. 9, line 9, for exemplary details of the substrate.

Another embodiment of the method of this invention is directed to the formation of a cluster compact such as shown in FIG. 3 and which consists essentially of self-bonded, boron-doped diamond and catalyst-solvent material. In this embodiment, steps (a) through (e) are practiced in the same manner described above except that the provision of the material for the formation of the carbide support for the abrasive particle layer either as carbide molding powder or in a preformed state is preferably omitted. When this is done, the source of catalyst-solvent material is separately added, preferably in the form of a metal disc placed in the reaction cell adjacent to the unbonded diamond particles (e.g., as shown and described in U.S. Pat. No. 3,609,818). Of course, if desired, a support of cemented carbide or other material may be brazed, or bonded under HP/HT, to the compact, after initial formation of the compact under HP/HT.

To further illustrate the practice of this invention, the following examples have been conducted.

EXAMPLE 1

A diamond compact was prepared by (1) heating a 0.170 gram of boron-doped diamond (−325 mesh) with a B dopant level of about 0.3% of the weight of the doped crystals in reducing $H_2$ gas atmosphere at 900° C. for one hour; (2) placing said diamond in a zirconium container (reaction cell); (3) placing a disc of cobalt cemented tungsten carbide (13 weight percent cobalt and 87 weight percent WC) within the cell and over the diamond; (4) placing the cell within a HP/HT apparatus as shown in FIG. 1 of U.S. Pat. No. 3,745,623; (5) applying pressure to about 52 kilobars; (6) maintaining said pressure and heating the assembly to a temperature of about 1500° C. for 20 minutes; (7) quenching the temperature first and then releasing the pressure; and (8) removing the compact from the HP/HT apparatus and removing the compact from the zirconium container.

FIG. 4 is a photomicrograph of a ground and polished section of this compact under 360 power magnification in Nomarski interference contrast polarized light. Examination of the photomicrograph reveals a substantial elimination of the grain boundaries (i.e., a high or extensive degree of diamond-to-diamond bonding is present) and a high diamond content relative to the pore volume which is filled with catalyst-solvent material. These factors, of course, yield an improved compact with hardness and abrasion resistance properties more nearly approximating that of single crystal diamond.

EXAMPLE 2

For purposes of comparison, a compact was made in accordance with the teaching of U.S. Pat. No. 3,745,623. The process used to produce the compact is the same as Example 1 (above) except that (a) in step (1) undoped, −325 mesh diamond powder was used, and (b) in steps (5) and (6) the pressure, temperature and time conditions were 65 kilobars, 1500° C. and 20 minutes, respectively.

Figure 5:
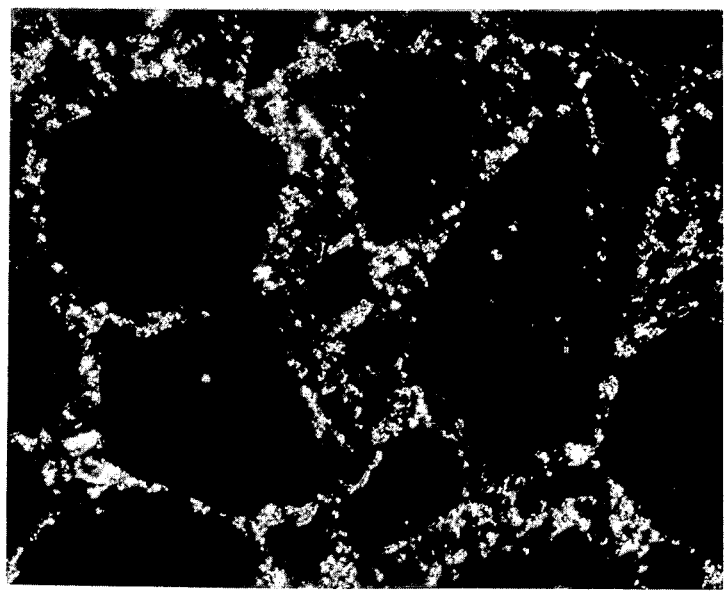
FIG. 5 is a photomicrograph of a portion of a ground and polished surface of a prior art diamond compact.

FIG. 5 is a photomicrograph of a ground and polished section of the compact of Example 2 under 300 power magnification in Nomarski interference contract polarized light. Comparison of FIGS. 4 and 5 reveals that the compact of Example 1 has more extensive diamond-to-diamond bonding and a smaller pore volume even though it is produced under substantially less severe HP conditions (20% less). Alternatively, this advantage of the invention may be realized by producing a compact with a level of self-bonding equivalent to the prior art either by operation at a less severe HP condition or by operation at the same HP condition but for a shorter period of time. Both of these modes of operation would yield a product with a lower cost of manufacture due to increased HP/HT apparatus life.

While this invention has been shown and described in connection with certain preferred embodiments thereof, other embodiments will be apparent to those skilled in the art. Accordingly, it is intended that this and other such embodiments be comprehended within the scope of this invention as defined in the appended claims.

What I claim as new and desire to secure by letters patent of the United States is:

1. In a process for making a compact comprising:
   (a) placing within a charge assembly (i) a mass comprised of diamond particles and (ii) a source of diamond catalyst-solvent material; and
   (b) subjecting said charge assembly and the contents thereof to thermodynamically stable conditions for the diamond content thereof at temperatures in the range of 1300° C. to 1600° C. and pressures in excess of about 45 kilobars; the improvement which comprises using boron doped diamond particles in step (a).

2. The process of claim 1 wherein said source of diamond catalyst-solvent is cemented carbide.

3. The process of claim 1 wherein said source of diamond catalyst-solvent is carbide molding powder.

4. The process of claim 1 wherein said source of diamond catalyst-solvent is a metal shim.

5. The process of claim 1 wherein said catalyst-solvent material is selected from the group consisting of:
   (a) a catalytic metal, in elemental form, selected from the group consisting of Group VIII metals Cr, Mn, Ta;
   (b) a mixture of alloyable metals of the catalytic metal(s) and non-catalytic metal(s);
   (c) an alloy of at least two of said catalytic metals; and
   (d) an alloy of the catalytic metal(s) and non-catalytic metal(s).

6. The process of claim 1 wherein the level of the boron dopant in said particles is between about 0.01% and 0.5% of the weight of the doped particles.

7. The process of claim 1 wherein said mass is at least 70% by volume diamond.

8. The process of claim 1 wherein said mass is at least 90% by volume diamond.

9. A compact comprised of a mass of self-bonded diamond particles doped with boron atoms distributed substantially uniformly throughout each of said particles.

10. The compact of claim 9 wherein said mass is porous.

11. The compact of claim 10 which further comprises a catalyst-solvent material dispersed in the pores of said mass.

12. The compact of claim 11 wherein said catalyst-solvent material is selected from the group consisting of:
    (a) a catalytic metal, in elemental form, selected from the group consisting of Group VIII metals Cr, Mn, Ta;
    (b) a mixture of alloyable metals of the catalytic metal(s) and non-catalytic metal(s);
    (c) an alloy of at least two of said catalytic metals; and
    (d) an alloy of the catalytic metal(s) and non-catalytic metal(s).

13. The compact of claim 9 further comprising a mass of cemented carbide, said carbide bonded to said compact along an interface.

14. The compact of claim 9 wherein said mass is at least 90% by volume diamond.

15. The compact of claim 9 wherein said particles are boron-doped to a level between about 0.01% to 0.5% of the doped particle weight.

16. A compact comprising:
    (a) a porous mass of self-bonded, boron-doped diamond particles, said mass comprising at least 90% by volume diamond, said particles containing a boron-dopant level between about 0.01% to 0.5% of the doped particle weight; and
    (b) a catalyst-solvent material dispersed in the pores of said mass, said material selected from the group consisting of:
       (i) a catalytic metal, in elemental form, selected from the group consisting of Group VIII metals Cr, Mn, Ta;
       (ii) a mixture of alloyable metals of the catalytic metal(s) and non-catalytic metal(s);
       (iii) an alloy of at least two of said catalytic metals; and
       (iv) an alloy of the catalytic metal(s) and non-catalytic metal(s).

17. A compact comprised of:
    (a) a porous mass of self-bonded, boron-doped diamond particles; and
    (b) a catalyst-solvent material dispersed in the pores of said mass.

18. The compact of claim 17 wherein said material is selected from the group consisting of:
    (a) a catalytic metal, in elemental form, selected from the group consisting of Group VIII metals Cr, Mn, Ta;
    (b) a mixture of alloyable metals of the catalytic metal(s) and non-catalytic metal(s);
    (c) an alloy of at least two of said catalytic metals; and
    (d) an alloy of the catalytic metal(s) and non-catalytic metal(s).

19. The compact of claim 17 further comprising a mass of cemented carbide, said carbide bonded to said compact along an interface.

20. The compact of claim 17 wherein said mass is at least 90% by volume diamond.

21. The compact of claim 17 wherein said particles are boron-doped to a level between about 0.01% to 0.5% of the doped particle weight.

* * * * *